Figure 5:
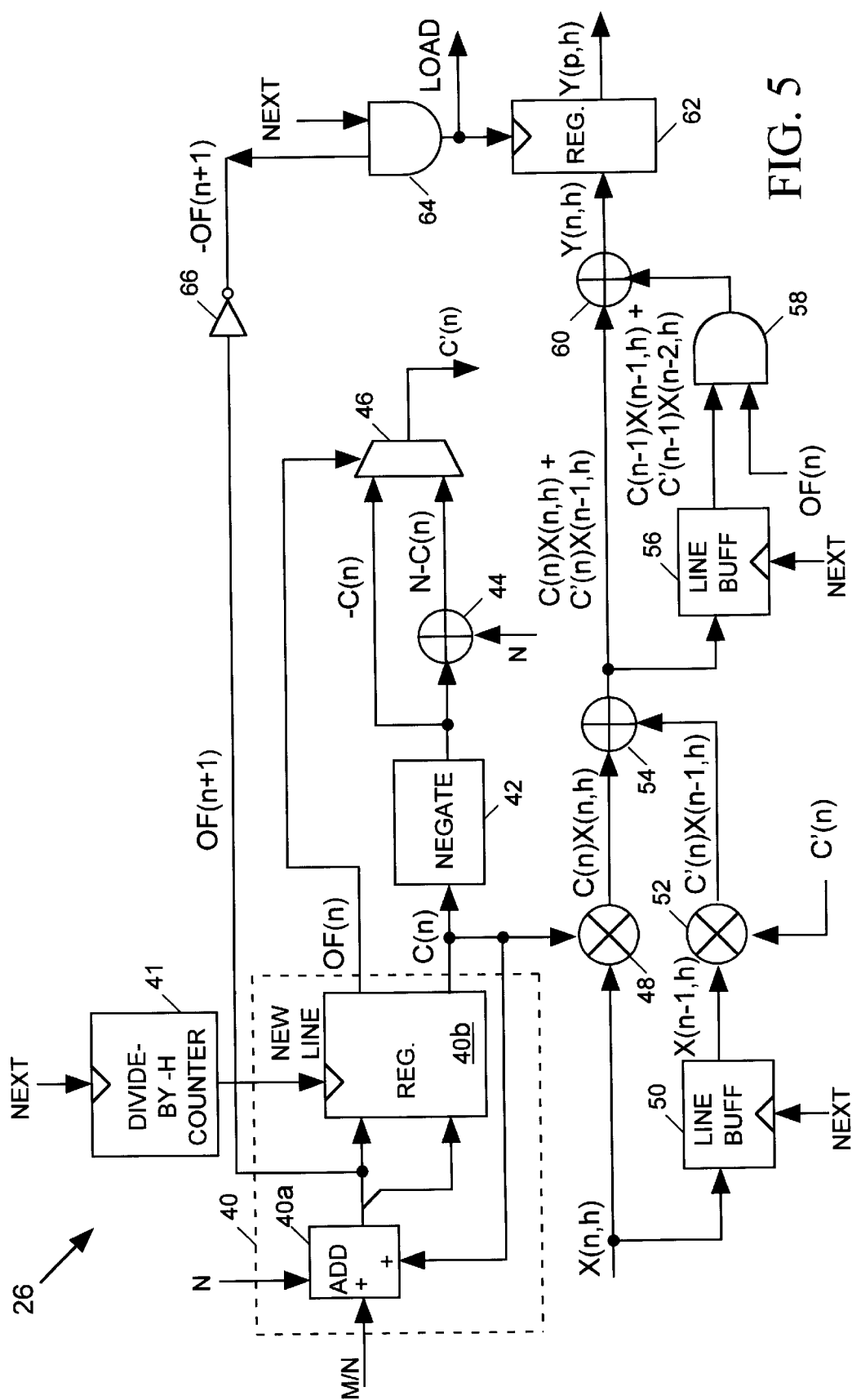

United States Patent [19]

Boehlke

[11] Patent Number: 5,862,268

[45] Date of Patent: Jan. 19, 1999

[54] BILINEAR DECIMATOR WITH ERROR COMPENSATION

[75] Inventor: Kenneth Alfred Boehlke, Beaverton, Oreg.

[73] Assignee: Focus Enhancements, Inc., Sudbury, Mass.

[21] Appl. No.: 822,810

[22] Filed: Mar. 24, 1997

[51] Int. Cl.⁶ .................................................. G06K 9/32
[52] U.S. Cl. .......................... 382/299; 245/127; 348/458
[58] Field of Search ................................. 382/260, 299, 382/300; 348/392, 440, 441, 446, 447, 448, 458, 469, 473, 580, 581, 910; 345/127, 129, 131

[56] References Cited

U.S. PATENT DOCUMENTS

| | | | |
|---|---|---|---|
| 4,204,227 | 5/1980 | Gurley | 348/392 |
| 4,677,483 | 6/1987 | Dischert et al. | 358/140 |
| 5,019,904 | 5/1991 | Campell | 348/446 |
| 5,253,041 | 10/1993 | Wine et al. | 348/448 |
| 5,268,751 | 12/1993 | Geiger et al. | 348/446 |
| 5,469,222 | 11/1995 | Spragne | 348/580 |

FOREIGN PATENT DOCUMENTS

| | | | |
|---|---|---|---|
| 0575862 | 12/1993 | European Pat. Off. | H04N 5/44 |
| 0589721 | 3/1994 | European Pat. Off. | H04N 5/44 |
| 2279844 | 1/1995 | United Kingdom | H04N 5/44 |
| 9714247 | 4/1997 | WIPO | H04N 5/44 |

*Primary Examiner*—Amelia Au
*Assistant Examiner*—Samir A Ahmed
*Attorney, Agent, or Firm*—Christopher P. Ricci

[57] ABSTRACT

A bilinear decimator converts an input data sequence representing a high resolution image formed by N horizontal pixel lines to an output data sequence representing a lower resolution image formed by P horizontal pixel lines where N>P. The decimation ratio P/N can be any rational fraction. When the decimation ratio reduces to the form $1-(1/n)$, the decimator computes the each output sequence data value as a simple weighted average of pixel data values for two vertically adjacent high resolution image pixels. When the decimation ratio is other than of the form $1-(1/n)$, the decimator adds additional terms to the computation of output pixel data values when necessary to compensate for aliasing errors.

4 Claims, 3 Drawing Sheets

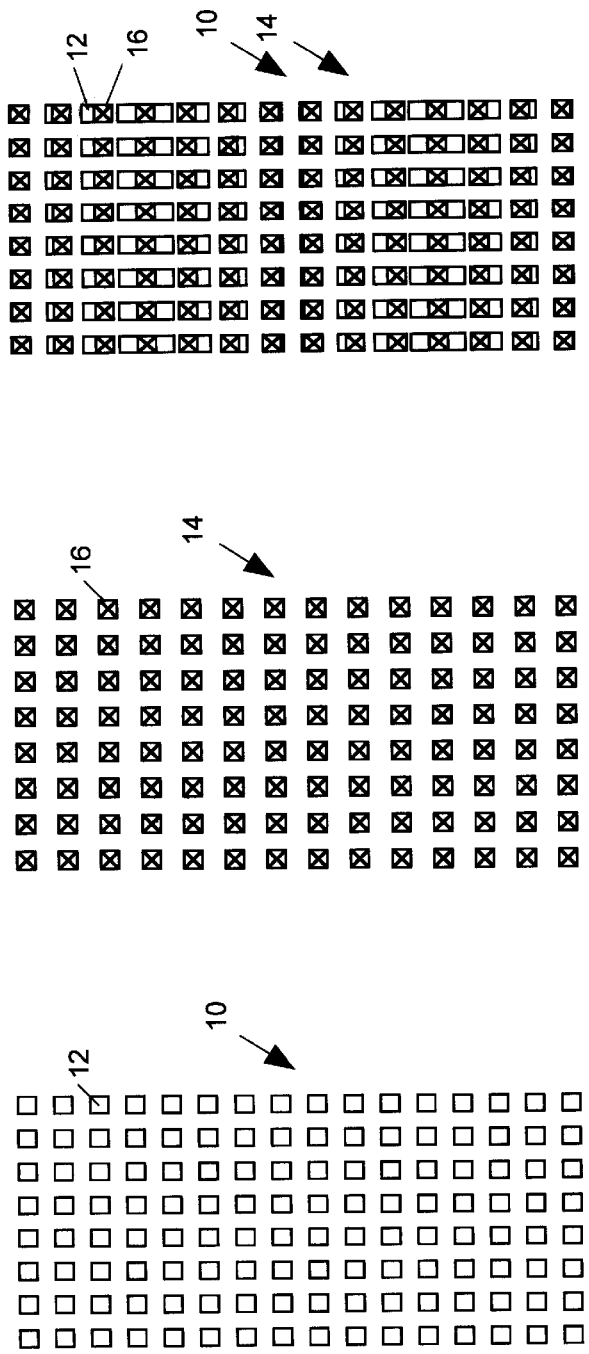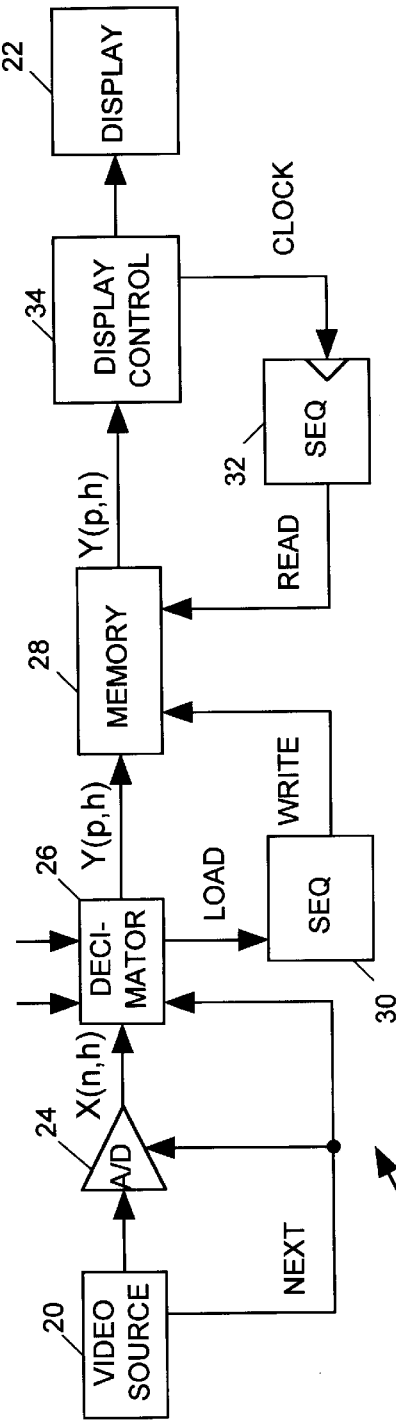

| n = 0  | p = 0  |
|--------|--------|
| n = 1  | p = 1  |
| n = 2  | p = 2  |
| n = 3  | p = 3  |
| n = 4  | p = 4  |
| n = 5  | p = 5  |
| n = 6  | p = 6  |
| n = 7  | p = 7  |
| n = 8  | p = 8  |
| n = 9  | p = 9  |
| n = 10 | p = 10 |
| n = 11 | p = 11 |
| n = 12 | p = 12 |
| n = 13 | p = 13 |
| n = 14 |        |
| n = 15 |        |

FIG. 6

| n = 0  | p = 0 |
|--------|-------|
| n = 1  |       |
| n = 2  | p = 1 |
| n = 3  | p = 2 |
| n = 4  |       |
| n = 5  | p = 3 |
| n = 6  |       |
| n = 7  | p = 4 |
| n = 8  | p = 5 |
| n = 9  |       |
| n = 10 | p = 6 |
| n = 11 | p = 7 |
| n = 12 |       |
| n = 13 | p = 8 |
| n = 14 |       |
| n = 15 | p = 9 |

FIG. 7

BILINEAR DECIMATOR WITH ERROR COMPENSATION

BACKGROUND OF THE INVENTION

1. Field of the Invention

The present invention relates in general to a bilinear decimator for reducing the vertical resolution of a pixel-based image and in particular to a decimator which compensates for aliasing errors.

2. Description of Related Art

An image formed by a set of N parallel lines of L pixels each may be represented by a matrix of pixel data values. Each pixel data value X(n,h) represents a visual characteristic (such as intensity or chroma) of the lth pixel of the nth line of the image. Since various standard video formats have differing numbers of lines, a pixel data matrix suitable for one video format may not be suitable for another. For example one computer video standard employs 768 lines and one television video format employs 400 lines. Although an image on the television may be the same size as an image on the computer screen, it has lower resolution in the vertical direction.

It is sometimes desirable to display image on one video system in response to a pixel data matrix generated by another. One of the problems associated with doing that is adjusting the size of the data matrix representing the image to match the standard of the video system that is to display the image. For example, in order to convert a pixel data matrix having 786 rows of data (one for each line of the computer video image) to a pixel data matrix having 400 rows of data (one for each line of the television image) we have to reduce the number of rows of data in the matrix. One method of doing that is simply to throw out the extra 386 rows of data. Depending on which rows of data we throw out, this would have the effect of clipping a part of the image when it is displayed. To retain some semblance of the full image on the television screen we could remove (decimate) rows of data in an distributed manner so that every second or third line of the image would be remove. However such an image would somewhat distorted because all of the information contained in decimated lines would be lost and the information contained in the retained lines would be over represented in the television image.

For example, suppose a high resolution image produces a certain shade of gray in an area of the image by vertically alternating black and white pixels. If we reduce resolution of the image, for example, by 50% by removing every other line of the image, the gray area in the lower resolution image will appear either all white or all black. This error condition arises because the decimation pattern matches a pixel pattern in the image. Such an error condition is called "aliasing".

U.S. Pat. No. 5,469,222 issued Nov. 21, 1995 to Sprague discloses a decimating filter for lowering the vertical resolution of an image through a process of interpolation. If we superimpose high and low vertical resolution versions of the same image, each pixel of the lower resolution image will fall between vertically adjacent pixels of the higher resolution image. Sprague's filter computes the value of each pixel of the lower resolution image as a weighted sum of the two vertically adjacent pixels of the higher resolution image. The weights are inversely proportional the distance between the output pixel and the adjacent pixels of the input image. Thus for example when reducing the resolution of an image by 50%, instead of throwing out every other pixel line, Sprague's filter produces one output image line for each pair of input image lines, where the intensity or color of a pixel of the output image line is the average intensity or color of vertically adjacent pixels of the two input lines. Since all of the data of the high resolution image has an equal influence on the low resolution image, the lower resolution image is less subject to aliasing errors than if it were produced by simply throwing out every other line of the high resolution image.

The decimation ratio P/N of a filter is the number (P) of lines in the low resolution image divided by the total number of lines (N) of the high resolution image. Sprague's filter employs fixed weighting factors for a given decimation ratio. That means that the relative position of each pixel of the output image is fixed in relation to its vertically adjacent neighbors and does not change from line to line. This is only true for decimation ratios that reduce to the form 1--(1/n) where n is an integer. Thus Sprague's decimator can decimate by a factor of ½, ¾, ⅞ . . . 1--(1/n). It cannot, for example, turn a 768 line image into a 400 line image because it is not capable of producing a decimation ratio of 368/768 (25/48).

U.S. Pat. No. 5,253,041 issued Oct. 12, 1993 to Wine et al, U.S. Pat. No. 4,204,227 issued May 20, 1980 to Gurley, and U.S. Pat. No. 5,159,451 issued Oct. 27, 1992 to Faroudja et al all disclose decimators which use fixed weighting factors for computing pixel values and are thus restricted to decimation ratios of the form 1--(1/n).

U.S. Pat. No. 5,019,904 issued May 28, 1991 to Campbell discloses a decimating filter which uses a lookup table to provide weighting factors that are functions of relative position of an output image pixels with respect to nearby pixels of the input image. Thus a pixel in any given line of the lower resolution output image is not restricted to a particular position with respect to vertically adjacent pixels of the higher resolution input image. Lacking such restriction, Campbell's weighting factor lookup table can be programmed to provide any vertical decimation ratio of the form P/N where P and N are integers. Thus Campbell's system is capable of implementing the 368/768 decimation ratio needed to lower the vertical resolution of the 768 line computer image to the 400 lines of television image.

To further reduce the likelihood of aliasing errors, Campbell's system uses data from the six vertically nearest pixels of the high resolution image, rather than two. Thus each output pixel data value is a weighted sum of contributions from six vertically adjacent pixels of the input image. The two high resolution image pixels nearest the low resolution image pixel are given more weight the remaining four. This reduces aliasing errors. One problem with Campbell's decimator is its size and cost. With six weighting factors, Campbell's system requires six multipliers. Multipliers require a lot space on an integrated circuit and are therefore expensive.

All prior art decimating systems which compute output pixel values as weighted combinations of values of N vertically adjacent input pixels require the use of at least N multipliers in order to apply the weights to the input pixels. Some system employ even more than N multipliers. U.S. Pat. No. 5,268,751 issued Dec. 7, 1993 to Geiger et al describes a polyphase FIR filter apparently employing fifteen fixed coefficients to produce a low resolution pixel as a weighted combination of 4 vertically adjacent high resolution pixels. However since the weighting factors are fixed, Geigher's system is restricted to a decimation ratio of 1--(1/n).

What is needed is a vertical decimation filter providing any desired decimation ratio of the form P/N (where P and N are integers P<N) but which minimizes aliasing errors when necessary without employing excessive numbers of multipliers.

SUMMARY OF THE INVENTION

An image may be formed by a set of horizontal lines of pixels. The present invention is a bilinear decimator which converts an input pixel data matrix representing a high resolution image formed by N lines of H pixels per line into an output pixel data matrix representing a lower resolution image formed by P lines of H pixels per line. P and N may be integers of any value where N>P. In the preferred embodiment of the invention, as described in detail herein below, the decimator computes a pixel data value for pixels of the low resolution output image as a weighted sum of pixel data values of the high resolution input image.

The input pixel data matrix has elements of the form X(n,h). Each element represents a value such as intensity or color of a corresponding pixel of the high resolution image. The subscript "n" denotes the line number of the pixel in the high resolution image and the subscript "h" denotes the horizontal position of the pixel along a line of the high resolution image. When the input sequence is applied to the decimator on a line by line basis, the decimator generates the output pixel data matrix having elements of the form Y(p,h) where "p" denotes the line number of a pixel of the low resolution and h denotes its horizontal position along line p.

In accordance with the invention, the decimator computes a preliminary output sequence Y(n,h) by implementing the following algorithm (expressed in pseudocode):

```
Err(0) = 0
C(0) = 0
Y(-1,h) = 0
Y(-2,h) = 0
C(n+1) = modulo[C(n+1)+M,N]
If C(n+1) < M then OF(n+1) = 1 else OF(n+1) = 0
IF OF(n) = 0 and n>0 then
    C' (n) = N-C(n)
    Y(n,h) = C(n)*X(n,h) + C' (n)*X(n-1,h)
Else
    C'(n) = -C(n)
    y(n-1,h) = INVALID
    Err(n,h) = y(n-1,h)+Err(n,h)
End IF
```

The decimator then produces a final output sequence Y(p,h) by removing all invalid elements Y(n,h) from the preliminary output sequence.

The decimator reduces aliasing by giving all pixel data elements of the input pixel data matrix the same amount of influence on the values of the computed output pixel data matrix. In other words, the total influence each input pixel data value has on the resulting low resolution image is a constant regardless of the position of the input pixel image or the decimation ratio implemented.

For decimation ratios P/N which reduce to 1--(1/n), the value X(n,h) of each input pixel has a positive influence on the values Y(p,n) and Y(p+1,h) of two vertically adjacent pixels of the output image with the weighting being determined by the input image pixel's position with respect to those two output image pixels. However, for decimation ratios P/N which do not reduce to 1--(1/n), where necessary to reduce aliasing, an output pixel value Y(p,h) is computed as a weighted sum of three input pixel values. Despite the fact that some output pixel data values are weighted sums of three input pixel data values, only two multipliers are employed to compute the weighted sum.

It is accordingly an object of the invention to provide a decimation filter that can convert an input pixel data sequence representing an image having high vertical resolution to an image having lower vertical resolution.

It is another object of the invention to provide a decimation filter that provides for a flexibly adjustable decimation ratio.

It is a further object of the invention to provide a decimation filter that compensates for aliasing errors without employing an large number of multipliers to carry out weighting operations.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWING(S)

FIG. 1 illustrates a high resolution image formed by a set of horizontal lines of pixels, FIG. 2 represents a lower resolution version of the image of FIG. 1, FIG. 3 illustrates a superposition of the lower resolution image of FIG. 2 over the higher resolution image of FIG. 1, FIG. 4 is a block diagram illustrating a video conversion system in which pixel data matrix produced by a high resolution video source controls a lower resolution display, FIG. 5 is a block diagram of the bilinear decimator of FIG. 4, FIG. 6 illustrates the spatial relationships between pixel lines of a 16 line image and pixel lines of a 14 line image, and FIG. 7 illustrates the spatial relationships between pixels lines of a 16 line image and pixel lines of a 10 line image.

DESCRIPTION OF THE PREFFERED EMBODIMENT(S)

FIG. 1 illustrates a high resolution image 10 formed by a set of N horizontal lines of pixels 12 having H pixels per line. In this case N is 16 and H is 8. For simplicity image 10 is illustrated as a pattern of white squares that would appear to be a solid block of white from a distance. However each pixel 12 could have a separately determined color and/or intensity so that image 10 would appear as a more complicated pattern.

Image 10 can be represented as an NxH matrix of pixel data values of the form X(n,h) where the variable "n" is the pixel line number of a corresponding pixel. The variable n is a member of the set {0 . . . N-1}. The variable "h", a member of the set {0,1, . . . 1}, represents the pixel's horizontal position along line n. The value of each element X(n,h) is encoded to represent the appearance of the corresponding pixel, for example, in terms of its color and/or intensity.

FIG. 2 represents an image 14 that is a lower resolution version of image 10 of FIG. 1. Image 14 could be represented by a PxH matrix of pixel data Y(p,h) where P is 14 and H is 8. Here "p", the line number of a pixel in of image 14, is a member of the set {0,1, . . . 13} and h is its horizontal position, a member of the set {0,1, . . . 7}.

FIG. 3 illustrates a superposition of the lower resolution image 14 of FIG. 2 over the higher resolution image 10 of FIG. 1. To enable us to distinguish between pixels of the two images, pixels 16 of lower resolution image 14 are marked with an "X". Note that image 14 is the same size as image 10 but has 14 lines instead of 16. However the pixel lines of image 14 are spaced farther apart and each pixel 16 represents a larger vertical portion of the image.

When we reduce the number of pixels in an image, we remove some of the information about that image. The manner in which we remove information from the higher resolution image affects the appearance of the lower resolution image. For example if a high resolution image 10 of FIG. 1 had alternating lines of black and white pixels, it would appear to be a solid block of gray from a distance. We could lower its resolution to produce image 14 by removing a few lines of pixels. If we were to remove only white lines, image 14 would appear darker than image 10. If we remove only black lines, the image 14 would appear lighter. Such "aliasing" errors arise from the manner in which we choose to throw away information about an image when we lower its resolution. We can minimize aliasing errors by being careful about how we throw away information.

FIG. 4 is a block diagram illustrating a video conversion system 18. System 18 includes video source 20, such as for example a computer, produces an output analog signal representing an image having 460 horizontal lines with H pixels per line. This signal is suitable for driving a computer monitor, but it is not used for that purpose. Instead the video conversion system converts the video output of source 20 to another video signal suitable for driving a different kind of display monitor 22, such as for example a conventional television monitor 22 which displays a 400 line×H pixel image. To carry out the conversion, the output signal of video source 20 is first digitized by a digitizer 24 to produce a matrix of pixel data values X(n,h). Digitizer 24 generates the matrix as an output sequence starting with X(0,0) and ending with X(N,H) with pixel data incurring in the sequence on a line-by-line basis. Digitizer (D/A converter) 20 is clocked by the a signal (NEXT) pulsed by source 20 on a pixel-by-pixel basis.

The output pixel data matrix generated by digitizer 24 is then supplied to a bilinear decimator 26 in accordance with the present invention. Decimator 26 also has as input constants indicating the number of lines N in the high resolution image and a "decimation ratio" P/N. Thus decimator 26 knows the required relationship between the number of high and low resolution image lines. Decimator 26, also clocked by the NEXT signal, produces an output sequence conveying a matrix of pixel data values Y(p,h) representing the lower resolution output image. A sequencer 30, clocked by a LOAD signal generated by decimator 26 whenever it produces a valid output data value Y(p,h), sequentially addresses and write enables an input port of a two-port memory 28 so that the decimator output matrix values Y(p,h) are stored at sequential addresses in memory 28.

At the same time, another sequencer 32 responds to a CLOCK signal from a display control unit 34 by periodically read addressing and enabling read output port of memory 28 so that it sequentially supplies the pixel data matrix values Y(p,h) to formatting unit 34. Display control unit 34 converts the Y(p,h) data sequence in a conventional manner into a signal suitable for driving display monitor 22 so that it produces the lower resolution image.

FIG. 5 is a block diagram the bilinear decimator 26 of FIG. 4 which converts the input data sequence conveying the N×H pixel data matrix of values X(n,h) representing a high resolution image into the output data sequence conveying a P×H pixel data matrix of values Y(p,h) representing the lower resolution image. We define "M" as the difference between N and the number of line P in the low resolution image; M=N−P. Decimator 26 calculates each value Y(n,h) of a preliminary output matrix according to the following algorithm (expressed in pseudocode):

```
Err(0) = 0
C(0) = 0
y(−1,h) = 0
y(−2,h) = 0
C(n+1)  = modulo[C(n+1)+M,N]
If C(n+1) < M then OF(n+1) = 1 else OF(n+1) = 0
IF OF(n) = 0 and n>0 then
        C' (n)   = N−C(n)
        y(n,h) = C(n)*X(n,h) + C' (n)*X(n−1,h)
Else
        C' (n) = −C(n)
        y(n−1,h) = INVALID
        Err(n,h) = Y(n−1,h)+Err(n,h)
End IF
```

Decimator 26 then produces the final output sequence Y(p,h) by removing all invalid elements Y(n,h) from the preliminary output sequence.

Referring again to FIG. 5, decimator 26 includes an accumulator 40 for generating the coefficient C(n). As seen in the above pseudocode, C(n) is the weight given to the current input sequence value X(n,h) when computing the current output sequence value Y(n,h). Accumulator 40 includes an adder 40a and a register 40b input enabled by the output of a divide-by-H counter 41. The NEXT signal clocks counter 41. Counter 41 produces an output NEW LINE pulse at the start of each new line h of pixel data. Adder 40a, having a count limit N controlled by input control data N, adds an input decimation ratio M/N to the output C(n) of register 40b and supplies the result to an input of register 40b. The upper bit of the adder 40a output is an overflow bit OF(n+1). When that bit is stored in register 40b it becomes overflow bit OF(n).

The output of accumulator 40, coefficient C(n), increases with for each NEW LINE pulse by the amount of M/N. Thus C(n) changes regularly with pixel line number h, with the change being determined by M/N. Adder 40a overflows upon counting to N, and generates the overflow signal OF(n+1). On the next NEW LINE pulse, C(n) is reset to a low value and the OF(n) signal is asserted. A negater 42 negates C(n) to produce −C(n) and an adder 44 adds N to −C(n) to produce N−C(n). The −C(n) output of negater 42 and the N−C(n) output of adder 44 are applied to inputs of a multiplexer 46 controlled by the OL signal from accumulator 40. Multiplexer 46 produces C'(n) as its output.

A multiplier 48 multiplies the incoming pixel data value X(n,h) by C(n). A line buffer 50 delays each incoming X(n,h) pixel data value by H NEXT pulses so that it later becomes output pixel data value X(n−1h) when the pixel data value for the adjacent pixel h of next line arrives at decimator 26. A multiplier 52 multiplies the X(n−1) output pixel data value of line buffer 50 by the C'(n) coefficient output of multiplexer 46. An adder 54 sums the outputs of multipliers 48 and 52. A line buffer 56 delays the output of adder 54 by H NEXT signal pulses (one line of pixel data) to produce the value C(n−1)*X(n−1,h)+C'(n−1)*X(n−2,h) supplied as an input to an AND gate 58. The OL(n) signal generated by accumulator 40 drives all bits of a second input of AND gate 58. An adder 60 sums the outputs of multiplexer 58 and adder 54 to produce a preliminary output data value Y(n,h) loaded into an output register 62 in response to each pulse of a LOAD signal produced by an AND gate 64.

The NEXT signal drives one input of AND gate 64 and the OL(n+1) accumulator 40 output signal, inverted by an inverter 66, drives a second input of register 62. Register 62 only stores "valid" values of Y(n,h). Thus the output pixel data matrix values Y(p,h) appear sequentially at the output of register 62.

Two examples will illustrate the operation of decimator 26 and the algorithm that it implements.

EXAMPLE 1

P/N=1−(1/n)

Let us assume that a "high" resolution image has N=16 lines of H=8 pixels each and that we want to turn this into a low resolution image having P=14 pixel lines of H=8 pixels each. Thus we have a decimation ratio of 14/16 which reduces to ⅞, of the form 1−(1 /n). The spatial relationships of pixels of the high and low resolution images appear as illustrated in FIGS. 1, 2 and 3.

FIG. 6 illustrates spatial relationship between center lines of the 16 lines n of the high resolution image and the center lines of the 14 lines p of the low resolution image when both images have the same height. Note that since pixels of the low resolution image are slightly taller than pixels of the high resolution image, the center line of line p=0 is slightly below the center line of line n=0 and the center line of line p=13 is slightly above center line of line n=15.

To implement example 1, we apply a ratio M/N=2/16 and a vertical line height N=16 as inputs to decimator 26. Table I below illustrates how decimator 26 calculates the overflow parameter OL, coefficients C(n) and C'(n), error terms Err(n) and output sequence value, Y(p,h). (For simplicity, the h subscript of Err(n,h), X(n,h) and Y(p,h) are omitted.)

image line p=0 is from input image line n=o. Accordingly we see from Table 1 that input pixel value X(1) has only three times the weight of the pixel value X(2). As we move progressively from line p=0 to p=8 the output image pixel line moves progressively closer to the next higher numbered line of the input image. The weighting factors C(0) and C'(0) change accordingly. Note that there is no output image line p between input pixel lines n=7 and n=8 and that the Y(n) value for n=8 is invalid.

Thus as may be seen from Table I, where P/M is of the form 1−(1/n), the value of output data Y(p,h) for a pixel at position h of line p is a weighted sum of pixel data values X(n,h) and X(n+1,h) for pixels of the two adjacent input image lines which vertically bound the pixel at position h of the output image line p. The weighting factors are inversely proportional to the vertical distance of the output image pixel from its nearest neighbor input image pixels.

If we sum the weighting coefficients for each value of X(n) in Table I we obtain a measure of the relative influence each value of X(n) has on the overall appearance of the low resolution image. Table II lists the results of the coefficient summation:

TABLE II

| X(n) | Rel. Infl. | X(n) | Rel. Infl. |
|---|---|---|---|
| X(0) | 7 | X(8) | 7 |
| X(1) | 7 | X(9) | 7 |
| X(2) | 7 | X(10) | 7 |
| X(3) | 7 | X(11) | 7 |
| X(4) | 7 | X(12) | 7 |
| X(5) | 7 | X(13) | 7 |
| X(6) | 7 | X(14) | 7 |
| X(7) | 7 | X(15) | 7 |

TABLE I

| n | OF (n) | C (n) | C' (n) | Err (n − 1) | Y (n) | Y (p) | p |
|---|---|---|---|---|---|---|---|
| 1 | 0 | 1 | 7 | 0 | X (1) + 7X (0) | X (1) + 7X (0) | 1 |
| 2 | 0 | 2 | 6 | 0 | 2X (2) + 6X (1) | 2X (2) + 6X (1) | 2 |
| 3 | 0 | 3 | 5 | 0 | 3X (3) + 5X (2) | 3X (3) + 5X (2) | 3 |
| 4 | 0 | 4 | 4 | 0 | 4X (4) + 4X (3) | 4X (4) + 4X (3) | 4 |
| 5 | 0 | 5 | 3 | 0 | 5X (5) + 3X (4) | 5X (5) + 3X (4) | 5 |
| 6 | 0 | 6 | 2 | 0 | 6X (6) + 2X (5) | 6X (6) + 2X (5) | 6 |
| 7 | 0 | 7 | 1 | 0 | 7X (7) + 1X (6) | — | — |
| 8 | 1 | 0 | 0 | 0 | — | 7X (7) + 1X (6) | 7 |
| 9 | 0 | 1 | 7 | 0 | X (9) + 7X (8) | X (9) + 7X (8) | 8 |
| 10 | 0 | 2 | 6 | 0 | 2X (10) + 6X (9) | 2X (10) + 6X (9) | 9 |
| 11 | 0 | 3 | 5 | 0 | 3X (11) + 5X (10) | 3X (11) + 5X (10) | 10 |
| 12 | 0 | 4 | 4 | 0 | 4X (12) + 4X (11) | 4X (12) + 4X (11) | 11 |
| 13 | 0 | 5 | 3 | 0 | 5X (13) + 3X (12) | 5X (13) + 3X (12) | 12 |
| 14 | 0 | 6 | 2 | 0 | 6X (14) + 2X (13) | 6X (14) + 2X (13) | 13 |
| 15 | 0 | 7 | 1 | 0 | 7X (15) + X (14) | — | — |
| 16 | 1 | 0 | 0 | 0 | — | 7X (1) + X (14) | 14 |

From Table I we first note that Err(n−1) is always zero. This arises because example 1 is a special case where the decimation ratio 14/16 reduces to the form 1−(1/n). Referring to FIG. 5, at n=7, −Err(n+1)=−Err(8)=0. Thus the Y(n,h) value is not loaded into register 62. At n=8, AND gate 58 passes the output of line buffer 56 to adder 60. However, since coefficients C(8) and C'(8) are both 0, Err(8) remains 0.

Note in FIG. 6 that line p=0 falls between line n=0 and line n=1 of the input image but is much closer to line n=0. In fact it is seven times closer. Accordingly, from Table I we see that influence of X(0,h) on the output value Y(0,h) is seven times that of X(1,h). The next output line p=1 falls between input lines n=1 and n=2. However the output image pixel line p=1 is a little farther from line n=1 than output Thus each value of X(n) has the same relative influence on the appearance of the low resolution image. This is desirable because if some values of X(n) were to have greater influence than others, aliasing errors would be introduced into the low resolution image. In the special case considered in example 1, where the decimation ratio is of the form 1−(1/n), when we can compute each value of Y(p) for any pixel of the low resolution image as a simple distance weighted sum of values X(n−1) and X(n) for vertically adjacent pixel of the high resolution image without having to compensate for aliasing errors since each value X(n) will have equal influence on the low resolution image, thereby minimizing aliasing errors.

EXAMPLE 2

$P/N <> 1-(1/n)$

A somewhat more complicated situation arises when the decimation ratio P/N is something other than of the form 1−(1/n). In example 2 we choose N to be 16 and M to be 6. Thus the input image has 16 lines and the output image has 10. FIG. 7 illustrates the spatial relationship between center lines of the 16 lines n of the high resolution image of example 2 and the center lines of the 10 lines p of the low resolution image when both images have the same height. Here the required decimation ratio is 10/16 is not reducable to the form 1−(1/n).

First let us determine what the values of Y(p) would be if we simply compute each value of Y(p) as an uncompensated, weighted sum of values X(n) and X(n−1) for the two high resolution image pixels vertically bounding each low resolution image pixel, with weighting being inversely proportional to the distance between lines of low and high resolution pixels. Table III illustrates the (approximate) results.

TABLE III

| Y(p) | Value |
| --- | --- |
| Y(1) | 1X(1) + 7X(0) |
| Y(2) | 6X(2) + 2X(1) |
| Y(3) | 3X(4) + 5X(3) |
| Y(4) | 1X(6) + 7X(5) |
| Y(5) | 5X(7) + 3X(6) |
| Y(6) | 2X(9) + 6X(8) |
| Y(7) | 7X(10) + 1X(9) |
| Y(8) | 3X(12) + 5X(11) |
| Y(9) | 2X(14) + 6X(13) |
| Y(10) | 7X(15) + 1X(14) |

Again, if we sum the weighting factors for each value of X(n) in Table III we can obtain a measure of the relative influence each value of X(n) has on the overall appearance of the low resolution. Table IV lists the results:

TABLE IV

| X(n) | Rel. Infl. | X(n) | Rel. Infl. |
| --- | --- | --- | --- |
| X(0) | 7 | X(8) | 6 |
| X(1) | 3 | X(9) | 3 |
| X(2) | 6 | X(10) | 7 |
| X(3) | 5 | X(11) | 5 |
| X(4) | 3 | X(12) | 3 |
| X(5) | 7 | X(13) | 6 |
| X(6) | 4 | X(14) | 3 |
| X(7) | 5 | X(15) | 7 |

From Table IV we see that some values of X(n) have more than ice the influence on the appearance of the low resolution image an other values of X(n) and that the relative influence of X(n) is highly dependent on n. Thus when the decimation ratio is other than of the form 1−(1/n) and we compute Y(p) as simply a weighted sum of values X(n) and X(n−1) of the two nearest vertically adjacent high resolution image, we introduce aliasing errors into the low resolution image. Such errors arise because some high resolution image pixel data values are given too much influence in the computation of the low resolution image pixel values while high resolution image pixel data value are given too little influence. Decimator 26 of FIG. 5 is designed to compensate for this kind of error by ensuring that values X(n) for all pixels of the high resolution image have equal overall influence in the computation of the low resolution image pixel data.

Suppose now that we use decimator 26 of FIG. 5 to compute values of Y(p) for example 2. In this case, the decimation ratio P/N supplied as input to decimator 26 is 10/16 and the value of N is 16. Table V illustrates results of decimator 26 operation.

TABLE V

| n | OF | C(n) | C(n) | Y(n) | Err(n) | Y((p) | p |
| --- | --- | --- | --- | --- | --- | --- | --- |
| 0 | 1 | 0 | 0 | — | 0 | 0 | 0 |
| 1 | 0 | 3 | 5 | 3X (1) + 5X (0) | — | 3X (1) + 5X (0) | 1 |
| 2 | 0 | 6 | 2 | 6X (2) + 2X (1) | — | — | — |
| 3 | 1 | 1 | −1 | | 1X (3) − 1X (2) | 1X (3) + 5X (2) + 2X (1) | 2 |
| 4 | 0 | 4 | 4 | 4X (4) + 4X (3) | — | 4X (4) + 4X (3) | 3 |
| 5 | 0 | 7 | 1 | 7X (5) + X (4) | — | — | — |
| 6 | 1 | 2 | −2 | | 2X (6) − 2X (5) | 2X (6) + 5X (5) + 1X (4) | 4 |
| 7 | 0 | 5 | 3 | 5X (7) + 3X (6) | — | — | — |
| 8 | 1 | 0 | 0 | | 0 | 5X (7) + 3X (6) | 5 |
| 9 | 0 | 3 | 5 | 3X (0) + 5X (8) | — | 3X (9) + 5X (9) | 6 |
| 10 | 0 | 6 | 2 | 6X (10) + 2X (9) | — | — | — |
| 11 | 1 | 1 | −1 | | 1X (11) − 1X (10) | 1X (11) + 5X (10) + 2X (9) | 7 |
| 12 | 0 | 4 | 4 | 4X (12) + 4X (11) | — | 4X (12) + 4X (11) | 8 |
| 13 | 0 | 7 | 1 | 7X (13) + 1X (12) | — | — | — |
| 14 | 1 | 2 | −2 | | 2X (14) − 2X (13) | 2X (14) + 5X (13) + 1X (12) | 9 |
| 15 | 0 | 5 | 3 | 5X (15) + 3X (14) | — | 5X (15) + 3X (14) | 10 |

Here the Err(n−1) value for several values of n is non-zero. causes several values of Y(n) to have three terms, weighted pixel data values X(n), X(n−1) and X(n−2) of three vertically adjacent pixels of the input high resolution image. Note that three weighted terms require three multiplications even through decimator 26 employs only two multipliers to carry them out. At n=2 the value of Y(n=2) is 6X(2) +2X(1), the weighted average for the input pixels that vertically bound the output pixel define by output data Y(p=2). Decimator 26 does not immediately load Y(n=2) into register 62 but instead waits until n=3, computes an error term X(3)–X(2), adds the error term to Y(n=2) to produce Y(n=3) and stores the result in register 62 as Y(p=2).

It is instructive to compare Table III with Table V. In Table III Y(p) is always the weighted sum of two vertically adjacent pixel data values. Note that X2 is over-represented in Table III. As seen in Table V, decimator 26 compensates for over-representation and under-representation errors by computing an error term and adding it to the weighted average. Thus we see that for Y(p=2) decimator 26 added error term Err(n=3)=X(3)–X(2) to the weighted average Y(n=2)=X(2)+2X(1) to obtain output value Y(p=2). Now, if we sum the coefficients for each value of X(n) appearing in Table V we obtain a measure of the overall influence each high resolution image pixel has on the resulting low resolution image. Note that since some of the coefficients are negative, they have a subtractive, rather than an additive, effect on the computation of a term's relative influence. Table VI lists the results of the coefficient summation.

TABLE VI

| X(n) | Rel. Infl. | X(n) | Rel. Infl. |
|---|---|---|---|
| X(0) | 5 | X(8) | 5 |
| X(1) | 5 | X(9) | 5 |
| X(2) | 5 | X(10) | 5 |
| X(3) | 5 | X(11) | 5 |
| X(4) | 5 | X(12) | 5 |
| X(5) | 5 | X(13) | 5 |
| X(6) | 5 | X(14) | 5 |
| X(7) | 5 | X(15) | 5 |

We see from Table VI that all pixel data value X(15) have equal influence on the calculation of the pixel data controlling the appearance of the output image.

Thus has been described a bilinear decimator for converting an input data sequence representing an image formed by N pixel lines to an output data sequence representing an image formed by P pixel lines where N>P. In particular the bilinear decimator compensates for aliasing errors that would otherwise occur when output low resolution image pixel data values are computed as simple weighted sums of pixel data values of values of vertically adjacent pairs of high resolution image pixels.

While the forgoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. An apparatus for converting an input matrix of pixel data values representing a high resolution image to an output matrix of pixel data representing a lower resolution image comprising:

means for computing a weighted sum of a first pair of pixel data values of said input matrix where a decimation value is of the form of $1-(1/n)$, where n is an integer, and for computing a weighted difference of a second pair of pixel data values of said input matrix where the decimation value is other than of the form $1-(1/n)$, and means for computing a sum of said weighted sum and said weighted difference using at least two multipliers for said weighted sums of three input pixel data values.

2. A method for converting an input matrix of pixel data values representing a high resolution image to an output matrix of pixel data representing a lower resolution image where the ratio of a number of lines in the output matrix to a number of lines in the input matrix is a decimation ratio, the method comprising the steps of:

computing a weighted sum of a first pair of pixel data values of said first matrix where a decimation value is of the form of $1-(1/n)$, where n is an integer, and computing a weighted difference of a second pair of pixel data values of said first matrix where the decimation ratio is other than of the form $1-(1/n)$, and computing a sum of said weighted sum and said weighted difference, using at least two multipliers for said weighted sum of input pixel data values.

3. An apparatus for converting an input matrix of pixel data values representing a high resolution image to an output matrix of pixel data representing a lower resolution image, the apparatus comprising a processor adapted to compute weighting coefficients for matrices where the ratio of a number of lines in the output matrix to a number of lines in the input matrix is other than of the form $1-(1/n)$, where n is an integer, said weighting coefficients being determined such that each of the pixel data values in the input matrix has the same relative influence on the appearance of the pixel data values in the output matrix.

4. The apparatus according to claim 3 wherein the weighting coefficient incorporates an error term.

* * * * *